(12) United States Patent
Shi et al.

(10) Patent No.: US 6,429,699 B1
(45) Date of Patent: Aug. 6, 2002

(54) GENERATOR OF NEURON TRANSFER FUNCTION AND ITS DERIVATIVE

(75) Inventors: Bingxue Shi; Chun Lu, both of Beijing (CN)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/741,447

(22) Filed: Dec. 19, 2000

(51) Int. Cl.⁷ .............................................. H02M 11/00
(52) U.S. Cl. ............................ 327/103; 706/33; 327/89
(58) Field of Search ................................ 327/52, 56, 65, 327/71, 89, 103; 326/35, 36; 706/44, 41, 38, 33

(56) References Cited

U.S. PATENT DOCUMENTS 5,648,926 A * 7/1997 Douglas et al. ............. 364/807
5,990,709 A * 11/1999 Thewes et al. ............... 327/89
6,229,376 B1 * 5/2001 Geysen ....................... 327/403
6,242,988 B1 * 6/2001 Sarpeshkar ................. 331/111

* cited by examiner

Primary Examiner—My-Trang Nu Ton
(74) Attorney, Agent, or Firm—Ladas & Parry

(57) ABSTRACT

This invention relates to an artificial neural network (ANN), particularly to a neuron circuit and its activation function including the derivative. The neuron circuit capable of generating an adjustable sigmoid-like function and a good approximation of its derivative, comprises: a current generator for generating a current; a current-controlled transistor for changing an output voltage according to the current from the current generator; and at least one differential pair of transistors for generating the adjustable sigmoid-like function output and the good approximation of its derivative by the changed output voltage.

16 Claims, 4 Drawing Sheets

GENERATOR OF NEURON TRANSFER FUNCTION AND ITS DERIVATIVE

BACKGROUND OF THE INVENTION

1. Field of the Invention

This invention relates to an artificial neural network (ANN), particularly to a neuron component and its activation function including the derivative.

2. Description of the Related Art

One of the artificial neural networks' most important components is the neuron, whose performance and complexity greatly affect the whole net. In many literatures, its activation function is found to be the sigmoid. Most of the analog implementations have used differential pair for generating the required function. In some cases, such as on-chip back-propagation learning, both a non-linear function and its derivative are required. Neurons that can meet the requirement have been presented. Most of these have voltage inputs and the current outputs. Since most of the applications employ current output synapses and voltage output neurons in order to enable the summation of those currents by simply connecting them together at the input of the neuron and to diverge signals from a neuron to a large quantity of synapses, these circuits a little bit inconvenient. In addition, some circuits are biased in the subthreshold region, so its driving capability is quite limited.

SUMMARY OF THE INVENTION

Therefore, an object of the invention is to provide a novel neuron circuit, which has current input and voltage outputs and is built with strong-inversion biased transistors, thereby realizing both a neuron activation function and its derivative.

Another object of the invention is to provide a novel neuron circuit, which enables threshold and gain factor adjustability and has high noise immunity.

Another object of the invention is to provide novel neuron circuit, which is very beneficial to on-chip learning neural networks.

To realize the above and other objects, the invention provides a novel neuron circuit, which is very beneficial to on-chip learning neural networks. The neuron circuit comprises: a pair of transistors having a first common terminal connected to a first input voltage, a second common terminal connected to a first output, a first gate connected to a second input voltage, and a second gate connected to a third input voltage; a surface field-effect transistor having a first terminal and a third gate connected together to the first output, which is connected to a first current source, and a second terminal connected to a second current source; and a first differential pair of transistors, having a third common terminal connected to a third current source, a first gate connected to the first output, a second gate connected to a fourth input voltage, a first terminal connected to a first load to form a connecting point as a second output, and a second terminal connected to a second load; a second differential pair of transistors, having a fourth common terminal connected to the third current source, a third gate connected to the first gate of the first differential pair of transistors output, a fourth gate connected to a fifth input voltage, a third terminal connected to a third load to form a connecting point as a third output, and a fourth terminal connected to a fourth load.

In the neural network, a neuron circuit design is the key point for the performance. In the invention with simple neuron circuit design, it can easily reach a requirement of errorless effect and decrease the time delay to within 1 ns. The circuit also has a large dynamic range and a high noise immunity using the adjustable threshold and gain factor. Therefore, these features make it quite fit for hardware realization besides its programmability.

BRIEF DESCRIPTION OF THE DRAWINGS

The invention will become apparent by referring to the following detailed description of a preferred embodiment with reference to the accompanying drawings, wherein:

FIG. 2b is a diagram of a relative error curve of FIG. 2a;

FIG. 3b is a diagram of a relative error curve, of FIG. 3a; and

DETAILED DESCRIPTION OF THE INVENTION

To realize the above and other objects, the invention provides a novel neuron circuit with adjustable threshold and gain factor and high noise immunity, which is very beneficial to on-chip learning neural networks.

Figure 1:
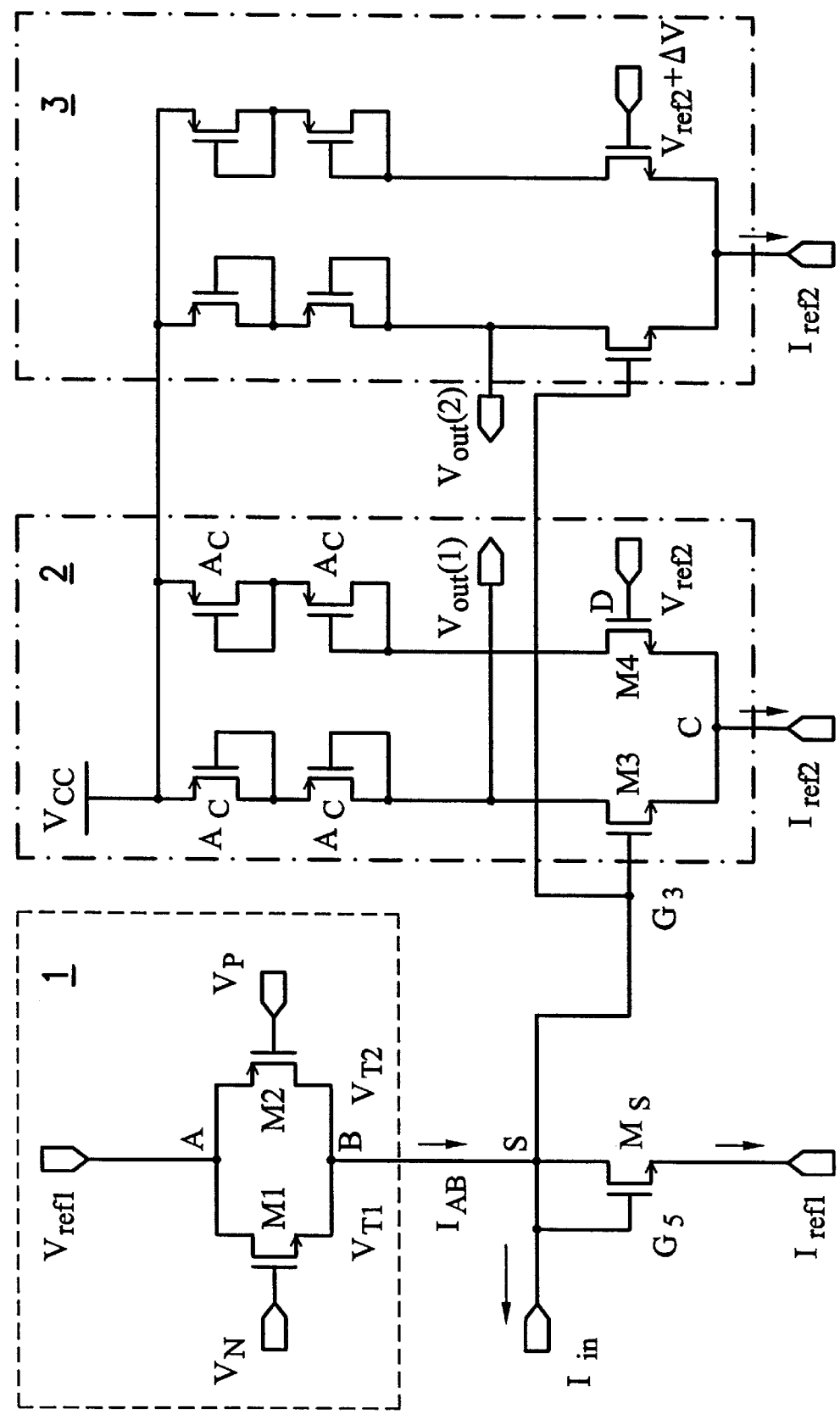
FIG. 1 is a schematic diagram of a neuron circuit of the invention.

Refer to FIG. 1, illustrating a neuron circuit of the invention. In FIG. 1, the neuron circuit comprises: a pair of transistors M1, M2, a surface field-effect transistor Ms, and at least one differential pair composed of identical transistors M3, M4.

As shown in FIG. 1, a pair of transistors M1, M2 having a first common terminal A and a second common terminal B, a surface field-effect transistor Ms having a first terminal S and a gate Gs concurrently connected to the output B of the pair M1, M2, and at least one differential pair composed of identical transistors M3, M4, which one gate G3 of identical transistors M3, M4 is connected to the output B of the pair M1, M2 and the other D is connected to a fixed input voltage $V_{ref2}$ or $V_{ref2}+\Delta V$, together with the active loads to realize the actual sigmoidal shaped non-linearity.

In the proposed neuron circuit schematic, as shown in FIG. 1, $V_{out}(1)$ outputs the sigmoidal transfer function. $(V_{out}(2)-V_{out}(1))$ realizes its approximate derivative. In the dash frame 1, which functions as a current generator, $V_{ref1}$ is carefully chosen so that both transistors M1 and M2 are working in their linear range. The formed linear resistor $R_{AB}$ can be controlled by the gate voltage of both transistors $V_N$ and $V_P$. A surface field-effect transistor Ms, which is a current-controlled transistor, is connected to the output of the frame 1, and its gate current source of the transistor Ms is used to adjust the output voltage of the neuron circuit, wherein the output voltage is the desired sigmoidal transfer function. In the case that the dash dot frame 2 outputs the desired sigmoidal transfer function while the dash dot frame 3 outputs its derivative, a simple differential pair composed of identical transistors, for example M3 and M4 of the frame 2, together with the active loads, for example Acs of the frame 2, realize the actual sigmoidal shaped non-linearity. One port of the differential pair is connected to point B and the other is connected to a fixed voltage $V_{ref2}$ or $V_{ref2}+\Delta V$. $I_{ref1}$ and $I_{ref2}$ are fixed current sources. The referenced current directions are shown as the arrows in FIG. 1.

Assuming that M3, M4 are operating in saturation and follow an ideal square law. $V_s$ is the input differential voltage, i.e. $V_d = V_B - V_D$, then $$I_{d3}(V_d) = (I_{ref2}/2) + \left[\left(\beta V_d \sqrt{\frac{4I_{ref2}}{\beta} - V_d^2}\right)/4\right] \quad (1)$$

With $$V_{d0} \equiv \sqrt{\frac{2I_{ref2}}{\beta}} \leq V_d \leq -\sqrt{\frac{2I_{ref2}}{\beta}} \equiv V_{d1}.$$

Here $\beta$ is the transconductance parameter for transistors M3 and M4. $I_{AB}=I_{in}+I_{ref1}$. When $I_{in}$ is small, $V_d > V_{d0}$, $V_{out}(1)$ remains the low saturation voltage. As $I_{in}$ increasing, $V_B$ descends tardily and $V_{out}(1)$ increases slowly. When $V_d < V_{d1}$, $V_{out}$ reaches and remains the high saturation level.

Figure 2A:
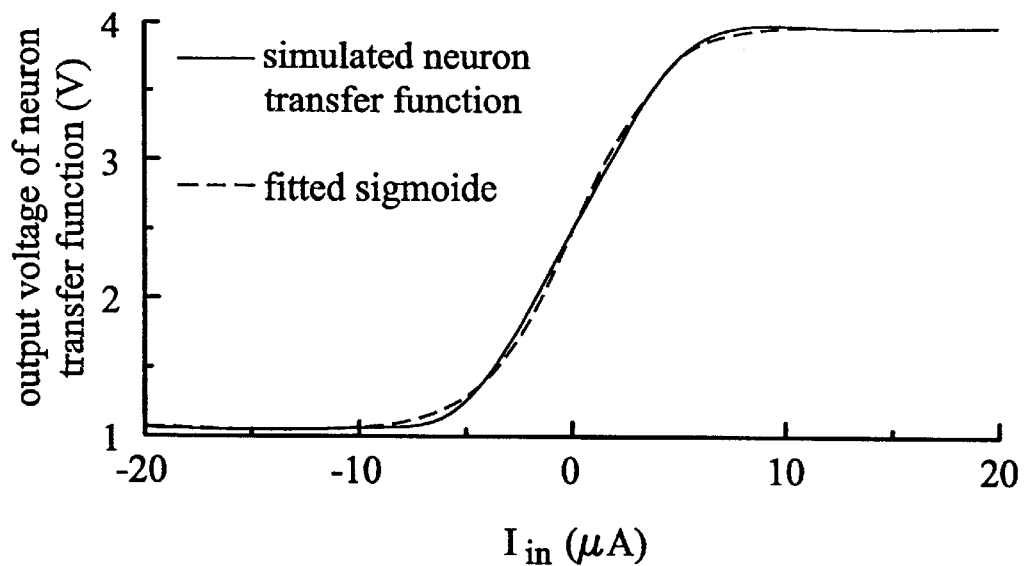
FIG. 2a is a diagram of comparing a simulate neuron transfer function curve to a fitted sigmoid curve of FIG. 1.
Figure 2B:
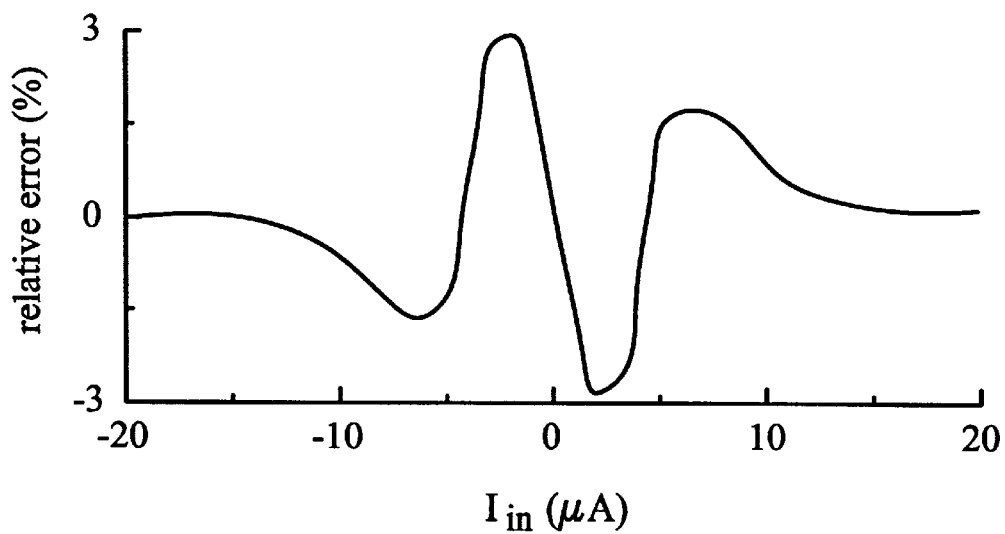

To verify that it operates correctly, the proposed circuit is simulated with HSPICE (Highly Optional Simulation Program Integrated Circuit Emphasis) in the art, using level 47 transistor models for a standard 1.2 $\mu$m CMOS process. FIG. 2(a) shows the neuron transfer function and its fitted sigmoid curve. Their relative error is not more than 3% as shown in FIG. 2(b).

Using the forward difference method, the approximate derivative voltage $V_{deriv}$ is available by subtracting $V_{out}(1)$ from $V_{out}(2)$.

$$V_{deriv} \equiv \Delta V V'_{out} \cong V_{out}(V_B(I_{in})-V_{ref2}+\Delta V)-V_{out}(V_B(I_{in})-V_{ref2})=V_{out}(2)-V_{out}(1) \quad (2)$$

Figure 3A:
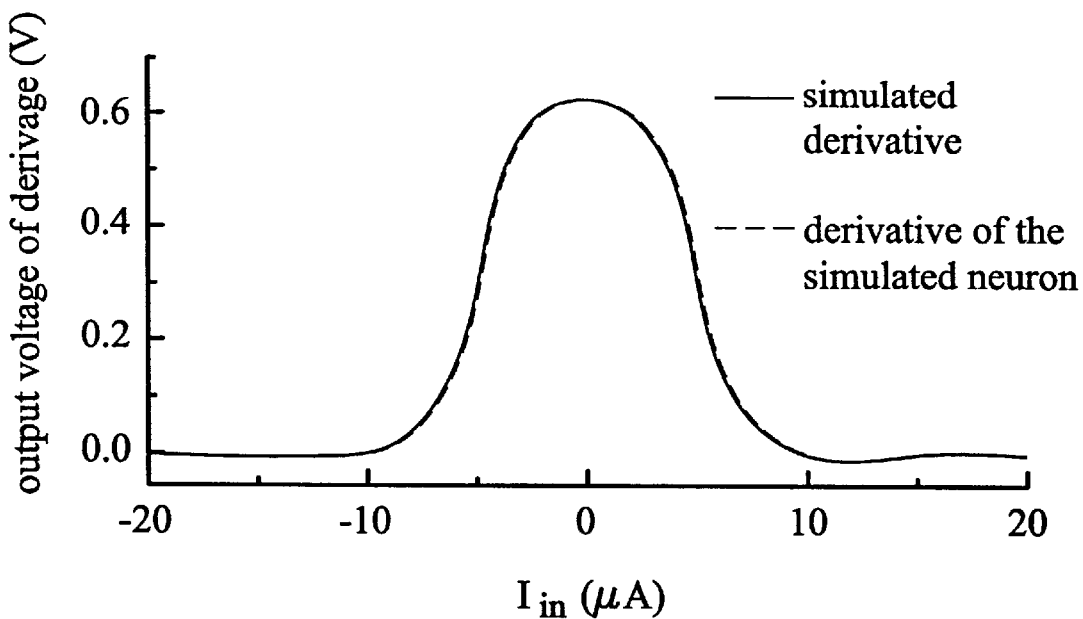
FIG. 3a is a diagram of comparing a simulated derivative curve to the derivative curve of the simulated neuron of the invention.
Figure 3B:
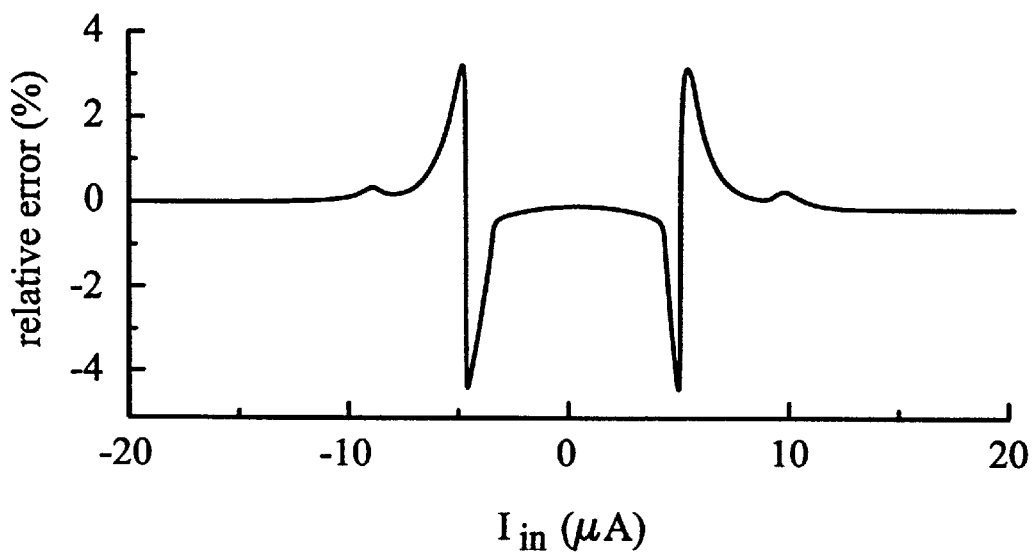

Here $\Delta V$ is a fixed small value. FIG. 3(a) shows the derivative found by simulation of the circuitry in FIG. 1 and the derivative of the simulated neuron transfer function. The solid line in FIG. 3(b) shows that the relative error between them is less than 5%.

The great power of an artificial neural network derives from its ability to be adapted to the unknown and changing environment. Therefore, good programmability is of fundamental importance. It is known that a sigmoid function can be given by $$f(X)=1/(1+\exp(-\alpha(X \cdot W)+\Theta))$$

where X is the input matrix, W is the weight matrix, $\alpha$ is the gain factor and $\Theta$ is the bias weight vector. Different applications may need a difference between $\alpha$ and $\Theta$. This can be realized by varying $I_{ref1}$, $V_N$ and $V_p$.

Figure 4:
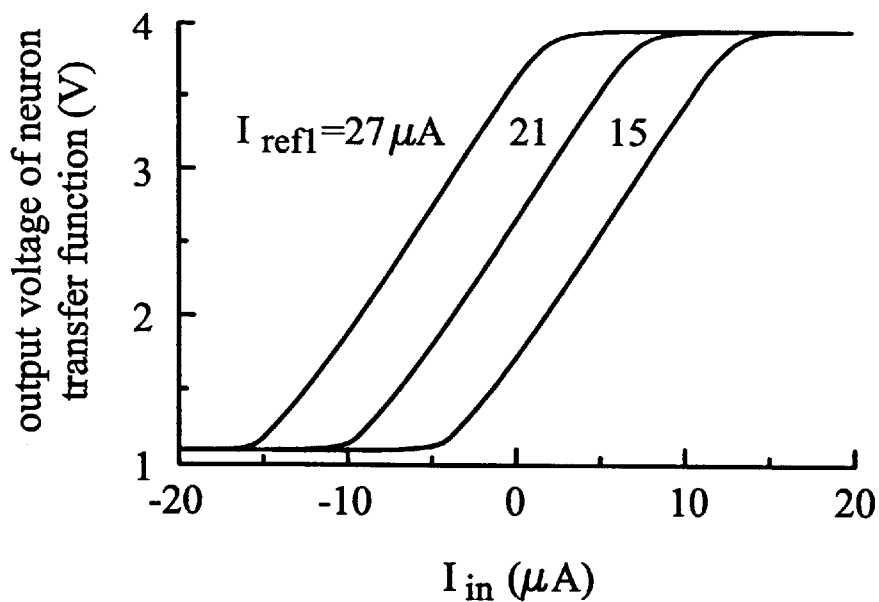
FIG. 4 is a diagram of simulated neuron transfer function curves with different thresholds of the invention.

When $I_{ref1}$ changes, the bias weight also changes. As $I_{ref1}$ increases, the current $I_{in}$ needed to satisfy $V_B-V_{ref2}>V_{d0}$ decreases, so the transfer curve shifts to the left. In the same way, when $I_{ref1}$ decreases, the curve shifts to the right. FIG. 4 shows the simulated neuron transfer functions with different thresholds.

When both transistors M1 and M2 are working in their linear range and their sizes are chosen in such a way that $\beta_1=\beta_2$, the relation between the current $I_{AB}$ and $V_{AB}$ can be written as $$I_{AB}=I_1+I_2=\beta_1 V_{AB}[(V_N-V_{T1})-(V_p-|V_{T2}|)] \quad (4)$$

So, $$R_{AB}=1/\{\beta_1 V_{AB}[(V_N-V_p)-(V_{T1}+|V_{T2}|)]\} \quad (5)$$

Equation 5 shows that the bigger $(V_N-V_p)$ is, the less $R_{AB}$ is. That is, the less the slope of $V_B$ versus $I_{in}$ is. This means that $V_{out1}$ increases more slowly, i.e. the gain factor is smaller.

Figure 5:
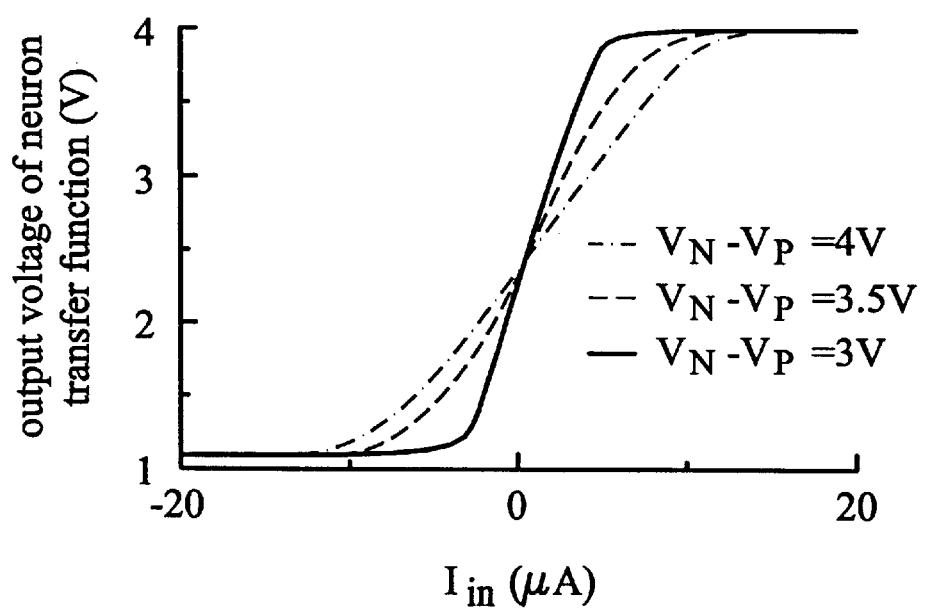
FIG. 5 is a diagram of activation curves under different gains of the invention.

Different transfer functions with various gain factors are described in FIG. 5. Note that the saturation levels of the sigmoid remain constant for different gain values, in contrast to most implementations in the prior art. This ensures that for different gain values, the input range of synapse in subsequent layer is completely used.

By utilizing the proposed neuron circuit that generates both an adjustable sigmoid-like function and a good approximation of its derivative has only a delay of within 1 ns in operation and speediness. Besides, the simple circuit composed of transistors as mentioned above, which works in the strong-inversion range, also has a large dynamic range and a high noise immunity. This is quite fit for hardware realization.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A neuron circuit, capable of generating an adjustable sigmoid-like function and a good approximation of its derivative, comprising:
   a current generator for generating a current by the different input voltages;
   a current-controlled transistor for changing an output voltage according to the current from the current generator; and
   at least one differential pair of transistors for generating the adjustable sigmoid-like function output and the good approximation of its derivative by the output voltage changed by the current-controlled transistor.

2. The neuron circuit of claim 1, wherein the current generator is a complementary pair of transistors with different input voltages from the gate electrodes.

3. The neuron circuit of claim 1, wherein the current-controlled transistor is a surface field-effect transistor.

4. The neuron circuit of claim 1, wherein the differential pair of transistors are respectively connected to a load to form an identified side to each other.

5. The neuron circuit of claim 4, wherein the load is any active device.

6. A neuron circuit, comprising:
   a pair of transistors having a first common terminal connected to a first input voltage, a second common terminal connected to a first output, a first gate connected to a second input voltage, and a second gate connected to a third input voltage;
   a surface field-effect transistor having a first terminal and a third gate connected together to the first output, which is connected to a first current source, and a second terminal connected to a second current source;
   a first differential pair of transistors, having a third common terminal connected to a third current source, a first gate connected to the first output, a second gate connected to a fourth input voltage, a first terminal connected to a first load to form a connecting point as a second output, and a second terminal connected to a second load; and a second differential pair of transistors, having a fourth common terminal connected to the third current source, a third gate connected to the first gate of the first differential pair of transistors output, a fourth gate connected to a fifth input voltage, a third terminal connected to a third load to form a connecting point as a third output, and a fourth terminal connected to fourth load.

7. The neuron circuit of claim 6, wherein the first differential pair of transistors and the second differential pair of transistors are identified in configuration.

8. The neuron circuit of claim 6, wherein both of the fourth input voltage and the fifth input voltage are constant values and have a fixed voltage difference.

9. The neuron circuit of claim 6, wherein the second output outputs a sigmoidal transfer function while the third output outputs an approximate derivative of the sigmoidal transfer function.

10. The neuron circuit of claim 6, wherein the second output outputs an approximate derivative of a sigmoidal transfer function while the third output outputs the sigmoidal transfer function.

11. The neuron circuit of claim 6, wherein all loads are identified and each comprises:

a first transistor, having a first terminal connected to an power voltage, a second terminal, and a gate connected to the second terminal; and a second transistor, having a first terminal connected to the second terminal of the first transistor, a second terminal connected to the respective transistor of the corresponding differential pair of transistors, and a gate connected to the second terminal.

12. A neuron circuit for generating an adjustable sigmoid-like function and approximation of its derivative, comprising:

a current generator, the current generator receiving different input voltages and generating a current;

a current-controlled transistor, the current-controlled transistor receiving the current and adjusting an output voltage; and at least one differential pair of identical transistors, the at least one differential pair of identical transistors receiving the adjusted output voltage and generating the adjustable sigmoid-like function and approximation of its derivative.

13. The apparatus of claim 12, wherein the current generator is comprised of two transistors, the two transistors operating in their linear region.

14. The apparatus of claim 13, wherein the two transistors have a first common terminal and a second common terminal.

15. The apparatus of claim 14, wherein a linear resistor is formed between the first common terminal and the second common terminal.

16. The apparatus of claim 15, wherein the linear resistor is controlled by the different input voltages.

* * * * *